Jan. 18, 1949.　　　　R. C. MASON　　　　2,459,667
CONTROL CIRCUITS
Filed Jan. 13, 1945
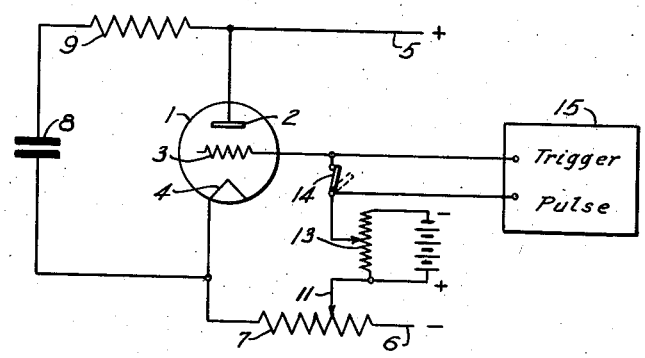
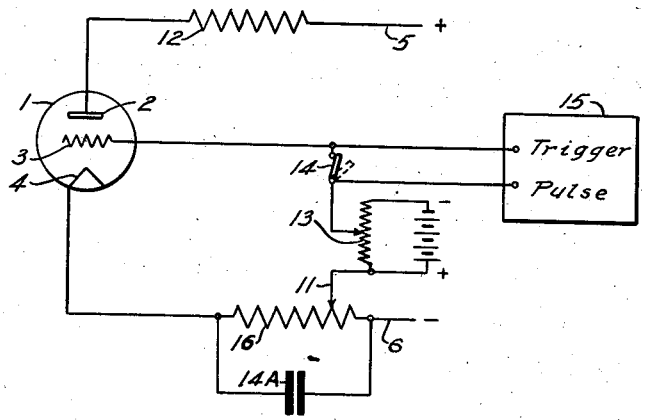
WITNESSES:
INVENTOR
Ruric C. Mason.
BY
ATTORNEY Patented Jan. 18, 1949

2,459,667

UNITED STATES PATENT OFFICE 2,459,667

CONTROL CIRCUITS

Ruric C. Mason, Forest Hills, Pa., assignor to Westinghouse Electric Corporation, East Pittsburgh, Pa., a corporation of Pennsylvania Application January 13, 1945, Serial No. 572,668

5 Claims. (Cl. 315—237)

My invention relates to electron tube circuits and, in particular, relates to relaxation tube circuits including oscillation generators of the so-called relaxation type.

It is known in the art that gaseous discharge triodes can be used to produce electrical oscillations, provided a proper circuit embodying a capacitor and suitable current-limiting impedances are connected across their principal electrodes. However, the maximum frequency of oscillation which it is possible to obtain with a given power output is found to be dependent in practice upon the size of the capacitor used. In general, the frequency of oscillation for a given size of capacitor may be increased by decreasing the amount of impedance which limits current flow to the capacitor from the charging source. However, it is generally found that where a certain critical value of current is exceeded, the production of oscillation ceases. For a given tube and line voltage the value of this current increases with the size of the capacitor used, but the maximum frequency at which oscillations can be maintained decreases as the size of the capacitor is increased. In short, where high frequencies are desired the size of the capacitor, and consequently the size of the line current and power output in oscillating energy, is decidedly limited and this renders such oscillation generators practically useless for many purposes.

Other relaxation circuits also exist which, while not able of themselves to produce sustained oscillations, will conduct briefly each time a voltage pulse is impressed on their control electrode circuits.

In accordance with my invention, I have discovered that by connecting a substantial impedance, for example a resistor, in series with the cathode of the discharge tube and connecting the control electrode of the discharge tube at a point on this resistor remote from the cathode, the amount of current which may be supplied to a given tube shunted by a capacitor of a given size can be greatly increased; or to put the matter in another way, the power output of the oscillations or triggered pulses which may be maintained at high frequency in such a tube is greatly increased by embodying the principles of my invention.

One object of my invention is, accordingly, to produce a relaxation tube in which powerful oscillations or pulses may be maintained at a relatively high frequency.

Another object of my invention is to provide a relaxation tube in which current variations may be maintained with a given input current from the charging source by means of a capacitor of relatively small size.

Still another object of my invention is to produce a relaxation tube in which the production of current variations may be reliably maintained.

Another object of my invention is to provide an improved circuit for operation of relaxation tubes.

Other objects of my invention will become apparent upon reading the following description taken in connection with the drawing, in which:

Figure 1 is a schematic diagram of one circuit embodying the principles of my invention, and Fig. 2 is a similar diagram for an alternative form of my invention.

Referring in detail to Figure 1, a vacuum-tight envelope 1 containing a gaseous atmosphere of suitable pressure conventional in the thyratron tube art contains an anode 2, a control electrode 3 and a cathode 4 which may, for example, be of the thermionically emissive type. The anode 2 is connected to the positive terminal 5 of a direct-current source of which the negative terminal 6 is connected through a resistor 7 to the cathode 4. A capacitor 8 is connected in series with a second resistor 9 between the cathode 4 and the anode 2. The control electrode 3 is connected to a suitable tap point 11 of which the position may be varied along the resistor 7. A source of variable negative bias 13 and a control switch 14 are preferably included in the circuit of grid 3. Where the tube 1 is to be used as an automatically operating oscillator the switch 14 is closed as shown. When the tube 1 is to be triggered to fix its frequency of discharge the switch 14 is opened to connect a source 15 of triggering voltage pulses in circuit with grid 2.

It will be evident to those skilled in the art that the portion of the resistor 7 included between the cathode 4 and the movable tap 11 imposes a negative bias on the control electrode 3 relative to the cathode 4, and I have found that the magnitude of the current from the cource 5, 6 at which oscillations may be maintained with a capacitor 8 of a given size is increased by increasing the amount of this negative bias relative to the voltage of the source 5, 6.

The resistor 9 is a current-limiting device regulating the discharge current from the capacitor 8, the discharge current being greater as the resistor 9 is decreased. The magnitude of the resistor 7 regulates the rate of charge of the capacitor 8 in conjunction with the resistor 9, in ways obvious to those skilled in the art. Usually, it will be found desirable that the resistor 9 shall be considerably smaller than the resistor 7.

It may be desired, in some cases, to provide an additional resistor between the anode 2 and the positive terminal 5 of the charging source 5, 6; but in such cases, it will be found that the size of the line current at which oscillations may be maintained with a capacitor of the given size will be increased if the resistance between the cathode 4 and the movable tap 11 has a magnitude which is a considerable fraction, say at least equal to 10%, of the resistance between the anode 2 and the positive terminal 5.

Referring in detail to Fig. 2 of the drawing, a tube 1 of the same type as that described in connection with Fig. 1 has its anode connected through a resistor 12 to the positive terminal 5 of a direct-current source. The negative terminal 6 is connected through a resistor 16, shunted by a capacitor 14A to the cathode 4. The control electrode 3 is connected to a suitable sliding tap 11 on the resistor 16 through elements 13, 14 and 15 as described in the circuit of Fig. 1. I have found that greater reliability of oscillation of the capacitor 14A will be maintained if resistor 12 is not greater than resistor 16 and that the portion of resistor 16 between the cathode 4 and the sliding tap 11 is a considerable fraction, say at least 10% of the resistance, of resistor 12 plus resistor 16.

While I have disclosed specific arrangements embodying the principles of my invention to comply with the patent statutes, it will be understood that these are for illustrative purposes only and that the principles of the invention are of broader application in size which will be self-evident to those skilled in the art.

I claim as my invention:

1. In combination a gaseous electrical discharge tube having an anode, a cathode and a control electrode, a source of voltage connected to supply current flow through said anode and said cathode, a first resistor connected between said cathode and said source of voltage, a capacitor and a second resistor connected in series in a circuit shunting said anode and said cathode, and a connection between said control electrode and a point on said first resistor, the portion of said first resistor between the last-mentioned point and said cathode being at least equal to 10% of the resistance of said second resistor.

2. In combination, a gaseous electrical discharge tube having an anode, a cathode and a control electrode, said anode being connected to the positive terminal of a direct-current source, a connection embodying a first resistor between said cathode and the negative terminal of said direct-current source, a capacitor and a second resistor connected in a channel shunted between said anode and said cathode, and a connection from said control electrode to a point on said first resistor, the resistance of the portion of said first resistor intervening between the last-mentioned point and said cathode being at least 10% of the resistance of said second resistor.

3. In combination with a gaseous discharge tube having an anode, a cathode and a control electrode, a direct-current source, a channel embodying a first resistor connecting said anode to the positive terminal of said direct-current source, a channel embodying a second resistor which is not substantially smaller than said first resistor shunted by a capacitor connecting said cathode to the negative terminal of said direct-current source, and a connection between said control electrode and a point on said second resistor, the resistance intervening between said point and said cathode being at least 10% of the combined magnitude of said first and second resistors.

4. In combination, a gaseous electrical discharge tube having an anode, a cathode and a control electrode, said anode being connected to the positive terminal of a direct-current source, a first resistor connected between said cathode and the negative terminal of said source, a capacitor and a second resistor connected in series to shunt said anode and said cathode, and a connection between said control electrode and a point on said first resistor, the portion of said first resistor between the last-mentioned point and said cathode being at least equal to 10% of the resistance of said second resistor.

5. In combination, a gaseous electrical discharge tube having an anode, a cathode and a control electrode, said anode being connected to the positive terminal of a direct-current source, a connection embodying a first resistor between said cathode and the negative terminal of said direct-current source, a capacitor and a second resistor connected in series as a shunt between said anode and said cathode, and a connection from said control electrode to a point on said first resistor, the resistance of the portion of said first resistor intervening between the last-mentioned point and said cathode being at least 10% of the resistance of said second resistor.

RURIC C. MASON.

REFERENCES CITED

The following references are of record in the file of this patent:

UNITED STATES PATENTS

| Number | Name | Date |
|---|---|---|
| 2,154,378 | Eller | Apr. 11, 1939 |
| 2,288,554 | Smith | June 30, 1942 |